United States Patent
Robertson et al.

(10) Patent No.: US 6,267,897 B1
(45) Date of Patent: Jul. 31, 2001

(54) METHOD OF INHIBITING BIOFILM FORMATION IN COMMERCIAL AND INDUSTRIAL WATER SYSTEMS

(75) Inventors: Linda R. Robertson, St. Charles; Victoria M. Kehoe, Aurora; Laura E. Rice, Chicago; Chandrashekar Shetty, Woodridge, all of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/564,244

(22) Filed: May 4, 2000

(51) Int. Cl.⁷ ....................................................... C02F 1/50
(52) U.S. Cl. ............................. 210/764; 252/180
(58) Field of Search ............................ 210/764; 252/175, 252/180

(56) References Cited

U.S. PATENT DOCUMENTS

| | | |
|---|---|---|
| 5,573,641 | 11/1996 | Meade et al. . |
| 5,624,575 | 4/1997 | Meade et al. . |
| 5,656,177 | 8/1997 | Werres . |
| 6,054,054 | 4/2000 | Robertson et al. . |
| 6,096,225 * | 8/2000 | Yang et al. . |
| 6,114,298 | 9/2000 | Petri et al. . |

OTHER PUBLICATIONS

K.A. Hammer et al., Antimicrobial activity of essential oils and other plant extracts. Journal of Applied Microbiology 1999, 86, 985–990.

S. Cosentino et al., In–vitro antimicrobial activity and chemical composition of Sardinian Thymus essential oils. Letters in Applied Microbiology 1999, 29, 130–135.

* cited by examiner

Primary Examiner—David A. Simmons
Assistant Examiner—Betsey Morrison Hoey
(74) Attorney, Agent, or Firm—Kelly L. Cummings; Thomas M. Breininger

(57) ABSTRACT

Biofilm formation is inhibited in commercial and industrial water systems through the addition of at least one plant oil.

8 Claims, No Drawings

METHOD OF INHIBITING BIOFILM FORMATION IN COMMERCIAL AND INDUSTRIAL WATER SYSTEMS

FIELD OF THE INVENTION

This invention relates generally to the field of water treatment technologies and, more particularly, to a method of inhibiting biofilm formation in commercial and industrial water systems.

BACKGROUND OF THE INVENTION

Biofouling has always been problematic in commercial and industrial water systems, such as cooling tower waters and air washers, because it can adversely affect heat transfer efficiency and fluid frictional resistance, thereby subsequently reducing production rates. Biofouling is also a problem in pulp and paper mill systems because the growth of microorganisms in papermachine fluids can adversely affect finished paper products, thereby requiring the papermachine to be shut down, resulting in the loss of productivity brought on by the down time of the machine. Furthermore, biofouling plays an important role in microbiologically influenced corrosion.

The presence of microorganisms in commercial and industrial waters cannot be totally eliminated, even with the excessive use of chemical biocides. The most common way to control biofouling is through the application of toxic chemical biocides such as chlorine, bromine, isothiazolones, glutaraldehyde or other antimicrobials. These biocides are added in an attempt to kill both planktonic and attached microorganisms.

Some microorganisms attach to inert surfaces forming aggregates with a complex matrix consisting of extracellular polymeric substances (EPS). This consortium of attached microorganisms and the associated EPS is commonly referred to as a biofilm. Biocides have difficulty penetrating biofilms and removing them from surfaces. Although excessive biocide dosages may be able to control biofouling, such use is costly and the presence of biocides in effluent waters is usually environmentally unacceptable.

Accordingly, it would be desirable to provide a method of inhibiting biofilm formation in commercial and industrial water systems which utilizes a low-cost, non-biocidal substance.

SUMMARY OF THE INVENTION

The method of the invention calls for adding one or more plant oils to a commercial or industrial water system. The addition of plant oil efficiently and effectively inhibits biofilm formation in commercial and industrial water systems. Moreover, the inventive method is economically appealing and environmentally acceptable because plant oils are low in cost and non-biocidal.

DETAILED DESCRIPTION OF THE INVENTION

The present invention is directed to a method of inhibiting biofilm formation in commercial and industrial water systems. In accordance with this invention, one or more plant oils are added to the commercial or industrial water system.

"Plant oils" (which are also known in the art as "natural oils" or "essential oils") are generally defined as volatile oils obtained from plants which possess the odor and other characteristics of the plant. The plant oils that may be used in the practice of this invention include eucalyptus, cinnamon, retsin, tea tree, clove, camphor, pine, spruce, neem, peppermint, spearmint, wintergreen, lime, orange, grapefruit, mandarin, lemongrass and citronella oils, as well as mixtures thereof. Eucalyptus oil and cinnamon oil are the most preferred plant oils.

The plant oils can be added to the commercial or industrial water system by any conventional method at a concentration which effectively inhibits biofilm formation. It is preferred that the amount of plant oil which is added to the commercial or industrial water system be in the range of about 1 ppm to about 10,000 ppm. More preferably, the amount of plant oil is from about 1 ppm to about 5,000 ppm, with about 1 ppm to about 250 ppm being most preferred.

The commercial and industrial water systems to which the plant oils may be added to inhibit biofilm formation include cooling waters; food, beverage and industrial process waters; pulp and paper mill systems; brewery pasteurizers; sweetwater systems; air washer systems; oil field drilling fluids and muds; petroleum recovery processes; industrial lubricants; cutting fluids; heat transfer systems; gas scrubber systems; latex systems; clay and pigment systems; decorative fountains; water intake pipes; ballast water tanks; and ship reservoirs, among others.

EXAMPLE

The following example is intended to be illustrative of the present invention and to teach one of ordinary skill how to make and use the invention. The example is not intended to limit the invention or its protection in any way.

A jar test was conducted to demonstrate the ability of the plant oils to interfere with the attachment of filamentous bacteria to surfaces. The plant oils of the invention were applied to paper machine fluids to prevent the attachment of microorganisms to machine surfaces and thereby prevent contamination of the machine by filamentous and other bacteria. Furthermore, by preventing the attachment of the biofilm, the plant oils also helped prevent contamination by wood fibers and fillers.

*Sphaerotilus natans* (a filamentous, slime-forming bacterium common to paper mills) was grown in a modified nutrient medium designed to promote biofilm formation. The uniform inoculum was harvested and aliquots were frozen and stored at −70° C. until needed.

Eight-ounce flush glass jars were rinsed once in acetone and twice in deionized water to remove any surface contaminants. The jars were autoclaved at 121° C. for 30 minutes. Predetermined volumes of the plant oils (cinnamon oil, eucalyptus oil and tea tree oil) were added directly to the jars.

50 mL of sterile medium were added to each jar and 100 $\mu$l of the thawed *Sphaerotilus natans* culture were added to each jar. The jars were placed into a New Brunswick Series 25 orbital shaker at 35° C. at 210 rpm. After 48 hours of incubation, the biofilms which attached and formed at the base of the jars were measured for diameter in centimeters and rated for vigor on a scale of 0 to +4. As used herein, "vigor" is defined as the visual characterization of the thickness and tenacity of the biofilm. A modified geometric mean was calculated for each jar by taking the square root of the diameter (in centimeters) multiplied by the vigor. Each experiment was set up with a minimum of three jars per concentration and treatment chemical. The average of all modified geometric means calculated for a specific plant oil and dosage was then averaged and listed in Table 1.

The results of the treatments are shown below in Table 1. The data illustrates that with cinnamon oil, the modified geometric mean of diameter and vigor at a 25 ppm dose is 1.6, which is significantly better than the ethylene oxide/propylene oxide (EO/PO) copolymer (Nalco product N-7611) in preventing microbial attachment to surfaces since a lower response number indicates a more active compound. EO/PO copolymers are currently used in industry to inhibit biofilm formation.

Table 1 also shows eucalyptus oil and tea tree oil at 100 ppm to perform better than the EO/PO copolymer at inhibiting biofilm formation.

TABLE 1

| Treatment | | Average Modified Geometric Mean | Average Diameter (cm) |
|---|---|---|---|
| Eucalyptus oil | | | |
| | @ 250 ppm | 1.71 | 1.47 |
| | @ 200 ppm | 1.98 | 2.18 |
| | @ 100 ppm | 2.5 | 3.08 |
| | @ 20 ppm | 2.87 | 3.63 |
| Cinnamon Oil | | | |
| | @ 25 ppm | 1.6 | 2.38 |
| | @ 10 ppm | 3.07 | 3.77 |
| | @ 5 ppm | 3.21 | 5 |
| Tea Tree Oil | | | |
| | @ 100 ppm | 3.16 | 2.55 |
| | @ 20 ppm | 4.18 | 6 |
| Ethylene oxide/ propylene oxide copolymer | | | |
| | @ 30 ppm | 3 | 3.2 |
| | @ 15 ppm | 3.4 | 4.7 |
| | @ 5 ppm | 4.7 | 5.8 |
| untreated | | 4.7 | 6 |

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of inhibiting biofilm formation in commercial and industrial water systems comprising the step of adding thereto an effective inhibiting amount of an agent consisting essentially of at least one plant oil.

2. The method of claim 1 wherein the plant oil is selected from the group consisting of eucalyptus, cinnamon, retsin, tea tree, clove, camphor, pine, spruce, neem, peppermint, spearmint, wintergreen, lime, orange, grapefruit, mandarin, lemongrass and citronella oils, and mixtures thereof.

3. The method of claim 1 wherein the plant oil is eucalyptus oil.

4. The method of claim 1 wherein the plant oil is cinnamon oil.

5. The method of claim 1 wherein the plant oil is added to the water system in an amount from about 1 ppm to about 10,000 ppm.

6. The method of claim 1 wherein the plant oil is added to the water system in an amount from about 1 ppm to about 5,000 ppm.

7. The method of claim 1 wherein the plant oil is added to the water system in an amount from about 1 ppm to about 250 ppm.

8. The method of claim 1 wherein the commercial and industrial water systems are selected from the group consisting of cooling waters; food, beverage and industrial process waters; pulp and paper mill systems; brewery pasteurizers; sweetwater systems; air washer systems; oil field drilling fluids and muds; petroleum recovery processes; industrial lubricants; cutting fluids; heat transfer systems; gas scrubber systems; latex systems; clay and pigment systems; decorative fountains; water intake pipes; ballast water tanks; and ship reservoirs.

* * * * *